US012744017B2

(12) United States Patent
Takeuchi et al.

(10) Patent No.: US 12,744,017 B2
(45) Date of Patent: Sep. 22, 2026

(54) DRIVE CIRCUIT AND DISPLAY DEVICE

(71) Applicant: Sharp Display Technology Corporation, Kameyama City (JP)

(72) Inventors: Yohei Takeuchi, Kameyama City (JP); Tatsuya Kawasaki, Kameyama City (JP); Kengo Hara, Kameyama City (JP); Masafumi Sugino, Kameyama City (JP); Hajime Imai, Kameyama City (JP)

(73) Assignee: SHARP DISPLAY TECHNOLOGY CORPORATION, Kameyama City (JP)

( * ) Notice: Subject to any disclaimer, the term of this patent is extended or adjusted under 35 U.S.C. 154(b) by 0 days.

(21) Appl. No.: 19/318,508

(22) Filed: Sep. 4, 2025

(65) Prior Publication Data

US 2026/0073886 A1 Mar. 12, 2026

(30) Foreign Application Priority Data

Sep. 11, 2024 (JP) ................................ 2024-157875

(51) Int. Cl.
*G09G 3/36* (2006.01)

(52) U.S. Cl.
CPC ....... *G09G 3/3677* (2013.01); *G09G 2310/08* (2013.01)

(58) Field of Classification Search
CPC ......................... G09G 3/3677; G09G 2310/08
See application file for complete search history.

(56) References Cited

U.S. PATENT DOCUMENTS

2010/0201659 A1* 8/2010 Miyake ................ H03K 17/162 345/205

FOREIGN PATENT DOCUMENTS

JP 2015181083 A 10/2015

* cited by examiner

*Primary Examiner* — Yaron Cohen
(74) *Attorney, Agent, or Firm* — Keating & Bennett, LLP

(57) ABSTRACT

A unit circuit of a gate drive circuit includes first to fourth transistors. The first transistor outputs a drive signal to a gate line. The second transistor is a transistor to which a set signal is inputted and which charges a node. The third transistor is a transistor to which a first reset signal is inputted and which discharges the node to a ground potential. The fourth transistor is a transistor to which a second reset signal supplied at a time point later than the first reset signal is inputted and which discharges the node to a gate-off voltage.

4 Claims, 11 Drawing Sheets

1a

COMPARATIVE EXAMPLE

COMPARATIVE EXAMPLE

DRIVE CIRCUIT AND DISPLAY DEVICE

BACKGROUND

1. Field

The present disclosure relates to a drive circuit and a display device.

2. Description of the Related Art

The unit circuit of a drive circuit described in Japanese Unexamined Patent Application Publication No. 2015-181083 has first to third transistors. The first transistor outputs an output signal in response to the input of a clock signal. In response to the input of a pre-stage signal, which is an output signal from the pre-stage, the second transistor charges a node connected to the gate electrode of the first transistor to a gate-on voltage. A gate-off voltage is applied to the source electrode of the third transistor, and the node is connected to the drain electrode of the third transistor. When the clock signal is supplied to the first transistor with the node charged, the node becomes a potential higher than the gate-on voltage. Further, in response to the input, to the gate electrode of the third transistor, of a post-stage signal, which is an output signal from the post-stage, and a reset signal, the potential of the node connected to the gate electrode of the first transistor is reduced (reset) to a low potential (gate-off voltage).

In the unit circuit of the drive circuit described in Japanese Unexamined Patent Application Publication No. 2015-181083, when the reset signal is input to the gate electrode of the third transistor, which is a transistor that discharges the node in response to the input of the reset signal (i.e., when the gate-source voltage becomes or exceeds a threshold voltage), the potential of the drain electrode becomes or exceeds the gate-on voltage. Therefore, when the reset signal is inputted to the gate electrode of the third transistor, a large potential difference (drain-source voltage) is generated between the potential of the drain electrode (a potential equal to or higher than the gate-on voltage) and the potential of the source electrode (the gate-off voltage), so that hot carriers having very high energy are generated. The generation of hot carriers is a cause of deterioration of the transistor.

Therefore, it is desirable to provide a drive circuit and a display device capable of suppressing the deterioration of a transistor that discharges a node of a unit circuit.

SUMMARY

A drive circuit according to a first aspect is a drive circuit that includes a plurality of unit circuits that each output a drive signal to one of scanning signal lines of a scanning signal line group. The unit circuits each include: a node; a first transistor that outputs the drive signal to the scanning signal line, wherein the node is connected to a gate electrode of the first transistor, a clock signal is applied to a source electrode of the first transistor, and a drain electrode of the first transistor is connected to the scanning signal line; a second transistor at which a set signal is inputted to the unit circuit, wherein the set signal is inputted to a gate electrode of the second transistor, and a drain electrode of the second transistor is connected to the node; a third transistor at which a first reset signal is inputted to the unit circuit, wherein the first reset signal is inputted to a gate electrode of the third transistor, a drain electrode of the third transistor is connected to the node, and a voltage lower than a gate-on voltage and higher than a gate-off voltage is applied to a source electrode of the third transistor; and a fourth transistor at which a second reset signal having a high level is inputted at a time point later than the first reset signal, wherein the second reset signal is inputted to a gate electrode of the fourth transistor, a drain electrode of the fourth transistor is connected to the node, and the gate-off voltage is applied to a source electrode of the fourth transistor.

A display device according to a second aspect includes: the drive circuit according to the first aspect; and a substrate on which the scanning signal line group is disposed.

DESCRIPTION OF THE EMBODIMENTS

Figure 1:
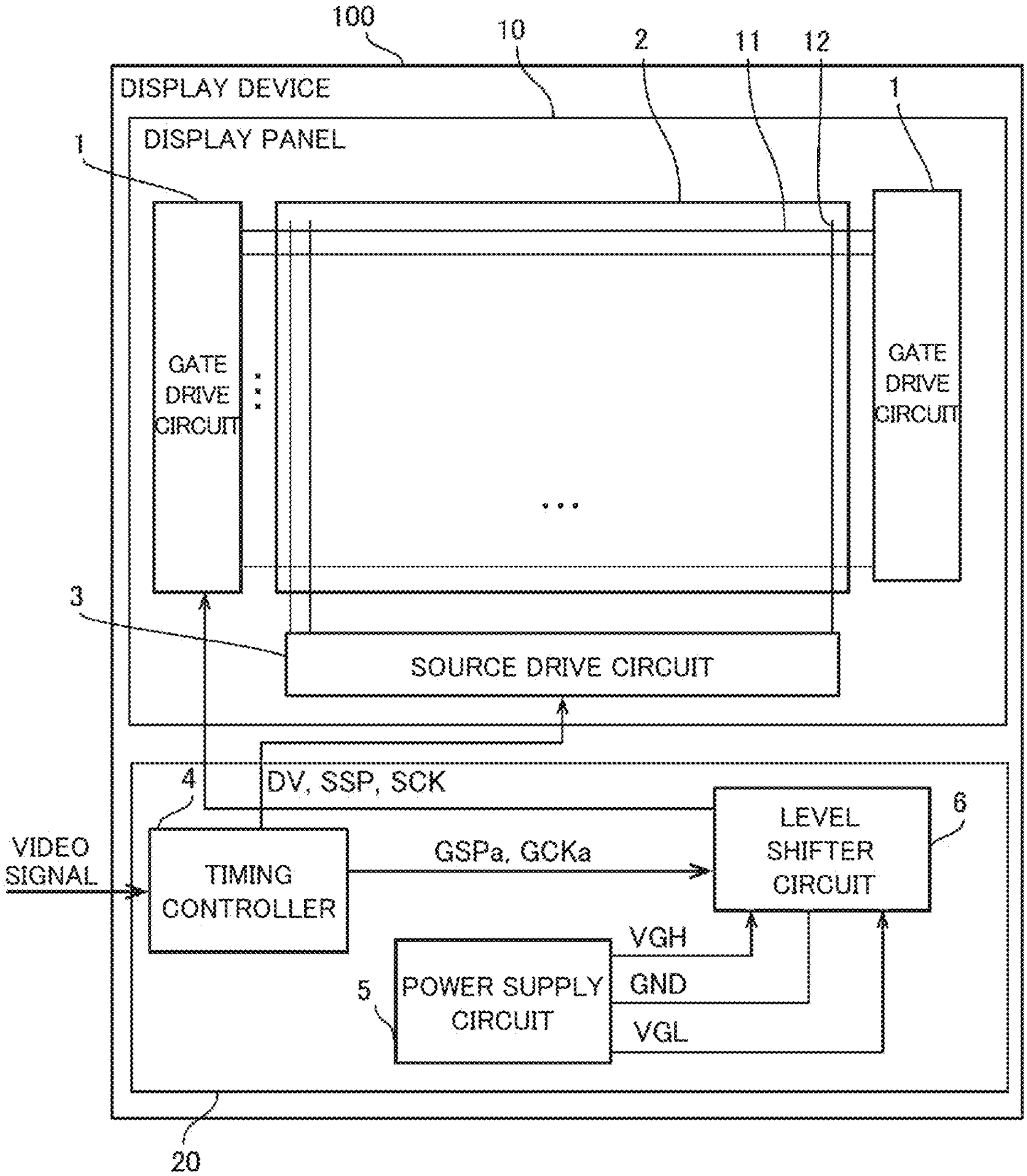
FIG. 1 is a block diagram showing a configuration of a display device according to one embodiment.

One embodiment of the present disclosure will be described below with reference to the drawings. Note that the present disclosure is not limited by the embodiment described below, but can be appropriately be modified in design within the spirit of the configuration of the present disclosure. Further, the same components or components having the same function in different drawings are provided with the same reference sign, and description of such components is not repeated. Further, the configurations described in the embodiment and modifications may appropriately be combined or modified within the spirit of the present disclosure. Further, to make the description easy to understand, in the drawings referred to hereinafter, the configurations are simply illustrated or schematically illustrated, or the illustration of a part of constituent members is omitted.

Overall Configuration of Display Device

Figure 2:
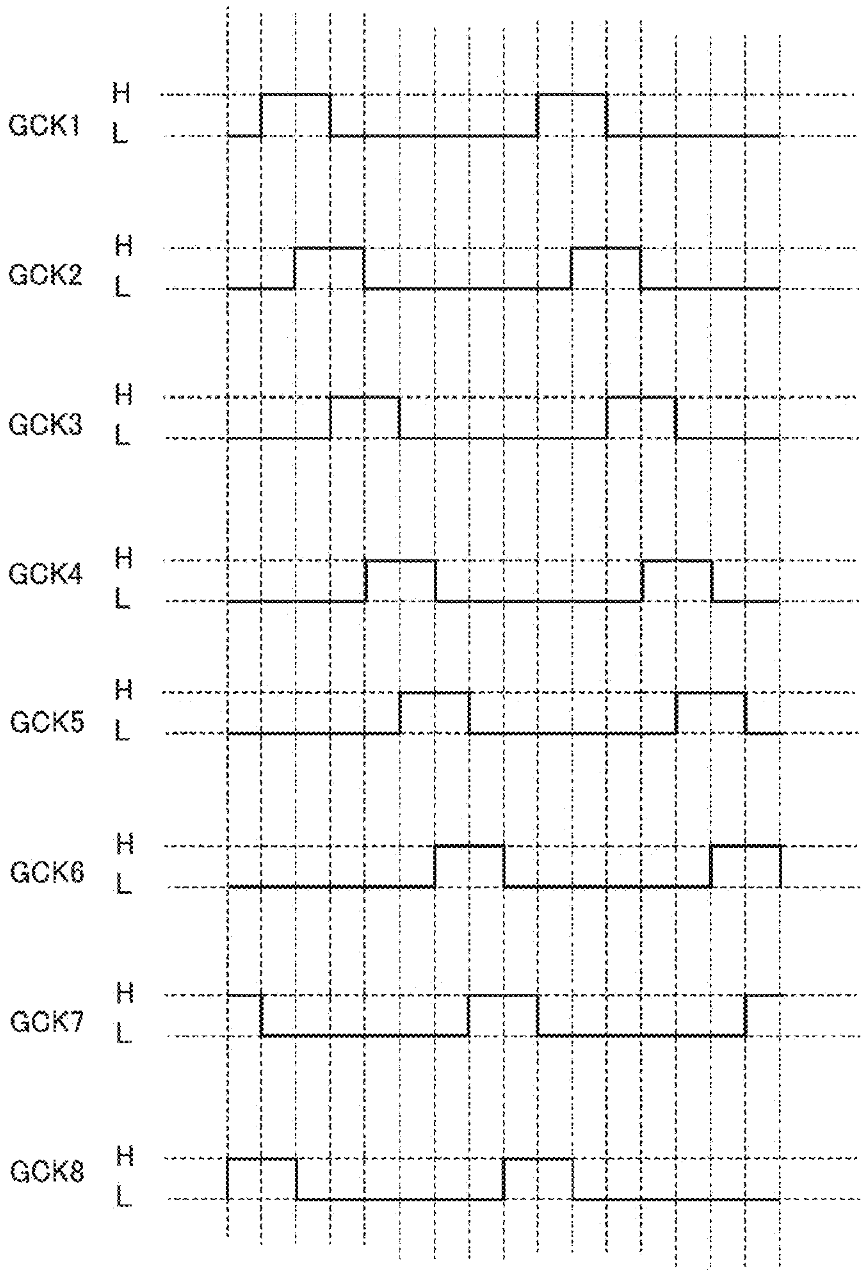
FIG. 2 is a timing diagram for explaining phases of clock signals.
Figure 3:
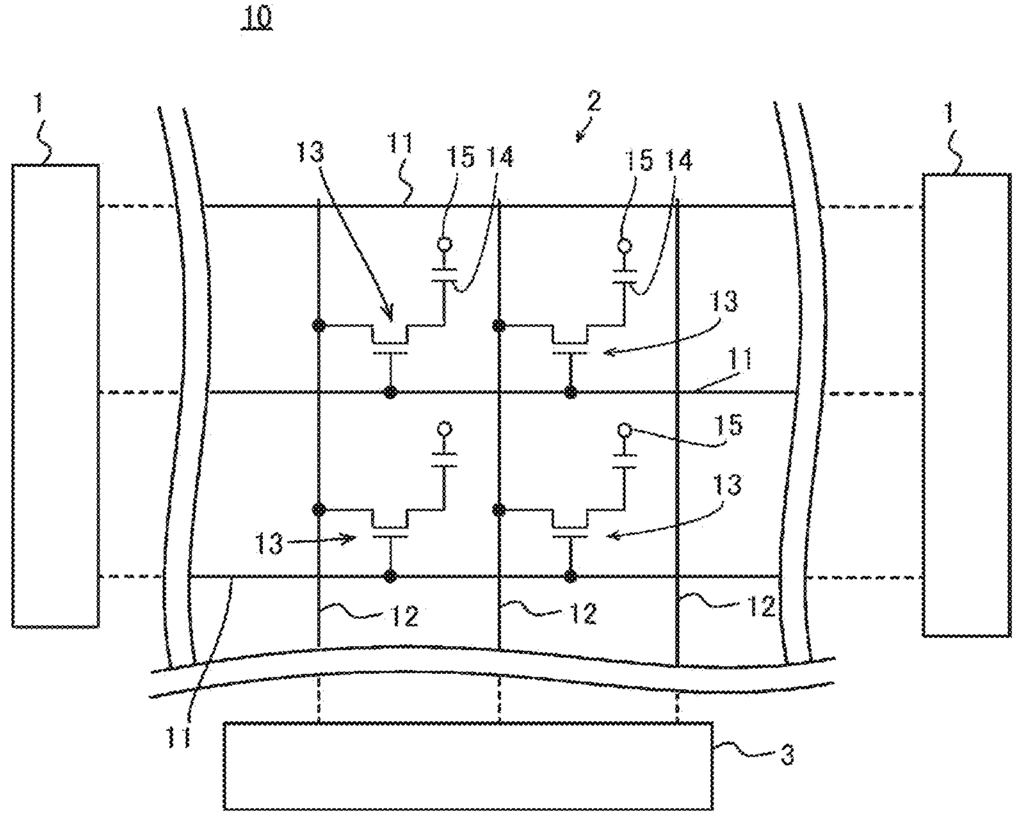
FIG. 3 is a block diagram showing a configuration of a display panel.

FIG. 1 is a block diagram showing a configuration of a display device 100 according to the present embodiment. FIG. 2 is a timing diagram for explaining the phases of clock signals GCK1 to GCK8. FIG. 3 is a block diagram showing a configuration of a display panel 10.

As shown in FIG. 1, the display device 100 includes the display panel 10 and a control board 20. The display panel 10 and the control board 20 are connected to each other via a flexible printed circuit board or the like. The display panel 10 includes gate drive circuit(s) 1, a display unit 2 which is an area where an image is displayed, and a source drive circuit 3. The control board 20 has a timing controller 4, a power supply circuit 5, and a level shifter circuit 6 provided thereon. The display device 100 can be configured as, for example, a liquid crystal display device.

As shown in FIG. 1, the timing controller 4 receives a timing signal (a horizontal sync signal, a vertical sync signal, a data enable signal or the like) and a video signal, and generates, based on the received signals, a digital video signal DV, a source start pulse signal SSP, a source clock signal SCK, a gate start pulse signal GSPa, and a gate clock signal GCKa. The timing controller 4 transmits the digital video signal DV, the source start pulse signal SSP, and the source clock signal SCK to the source drive circuit 3. Further, the timing controller 4 transmits the gate start pulse signal GSPa and the gate clock signal GCKa to the level shifter circuit 6.

The power supply circuit 5 generates a gate-on voltage VGH and a gate-off voltage VGL based on power inputted from an external power supply or a battery (not shown). The gate-on voltage VGH and the gate-off voltage VGL are voltages having a DC constant level (voltage value). The gate-on voltage VGH is a voltage higher than a ground potential GND; hereinafter, a voltage having the same potential as the gate-on voltage VGH is referred to as "High-level" (denoted as "H" in the drawings). The gate-off voltage VGL is a voltage lower than the ground potential GND; hereinafter, a voltage having the same potential as the gate-off voltage VGL is referred to as "Low-level" (denoted as "L" in the drawings).

The level shifter circuit 6 generates a gate start pulse signal GSP and the clock signals GCK1 to GCK8 based on the gate-on voltage VGH and the gate-off voltage VGL. As shown in FIG. 2, the clock signals GCK1 to GCK8 are signals that repeat the High-level and the Low-level, and are signals for controlling the operation of the gate drive circuit 1. The clock signal GCK2 is delayed in phase by 45 degrees with respect to the clock signal GCK1. The clock signal GCK3 is delayed in phase by 90 degrees with respect to the clock signal GCK1. The clock signal GCK4 is delayed in phase by 135 degrees with respect to the clock signal GCK1. The clock signal GCK5 is delayed in phase by 180 degrees with respect to the clock signal GCK1. The clock signal GCK6 is delayed in phase by 225 degrees with respect to the clock signal GCK1. The clock signal GCK7 is delayed in phase by 270 degrees with respect to the clock signal GCK1. The clock signal GCK8 is delayed in phase by 315 degrees with respect to the clock signal GCK1. The gate start pulse signal GSP is a signal inputted, as a set signal, to a unit circuit 1*a* of a first stage and a unit circuit 1*a* of a second stage of the gate drive circuit 1, and is a signal for starting the drive of the gate drive circuit 1.

As shown in FIG. 3, the gate drive circuit 1 is disposed on two sides or one side of the display unit 2. Note that FIGS. 1 and 3 show an example in which two gate drive circuits 1 are disposed in a one-to-one manner on two sides of the display unit 2. Note that since the two gate drive circuits 1 have the same configuration, the configuration of one of the two gate drive circuits 1 will be described and the configuration of the other will be omitted. The gate drive circuit 1 is a gate driver on array (GOA: Gate on Array) formed on an active matrix substrate of the display panel 10.

A plurality of gate lines 11 constituting a scanning signal line group connected to the gate drive circuit 1 and a plurality of source lines 12 constituting a source signal line group connected to the source drive circuit 3 are arranged in the display panel 10. The plurality of gate lines 11 and the plurality of source lines 12 are arranged so as to intersect each other, and pixels are arranged in each region divided by the plurality of gate lines 11 and the plurality of source lines 12. The plurality of pixels are arranged in a matrix on the display panel 10.

As shown in FIG. 3, each pixel is provided with a pixel transistor 13 and a pixel electrode 14. The gate electrode of the pixel transistor 13 is connected to the gate line 11. The source electrode of the pixel transistor 13 is connected to the source line 12. The drain electrode of the pixel transistor 13 is connected to the pixel electrode 14.

When the pixel transistor 13 is turned on by a drive signal (gate signal) supplied via the gate line 11, a source signal supplied via the source line 12 is written (charged) into the pixel electrode 14. Thus, an electric field is generated between the pixel electrode 14 and a common electrode 15 disposed opposite to the pixel electrode 14. The display unit 2 includes an active matrix substrate, a counter substrate disposed opposite to the active matrix substrate, and a liquid crystal layer disposed between the active matrix substrate and the counter substrate. The liquid crystal layer is driven by the electric field generated between the pixel electrode 14 and the common electrode 15 to display an image on the display panel 10. Configuration of gate drive circuit 1

Figure 4:
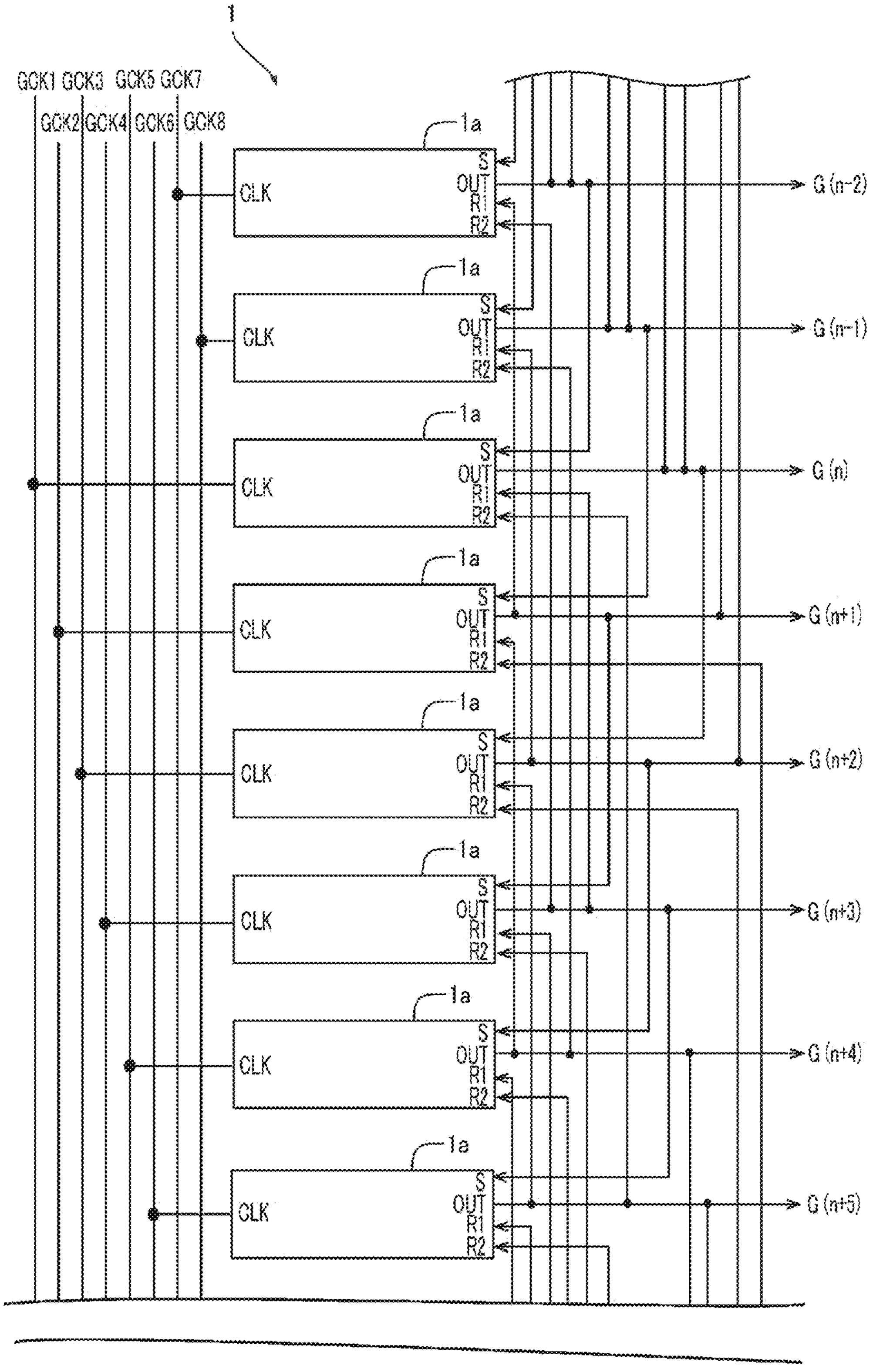
FIG. 4 is a diagram showing a configuration of a gate drive circuit.
Figure 5:
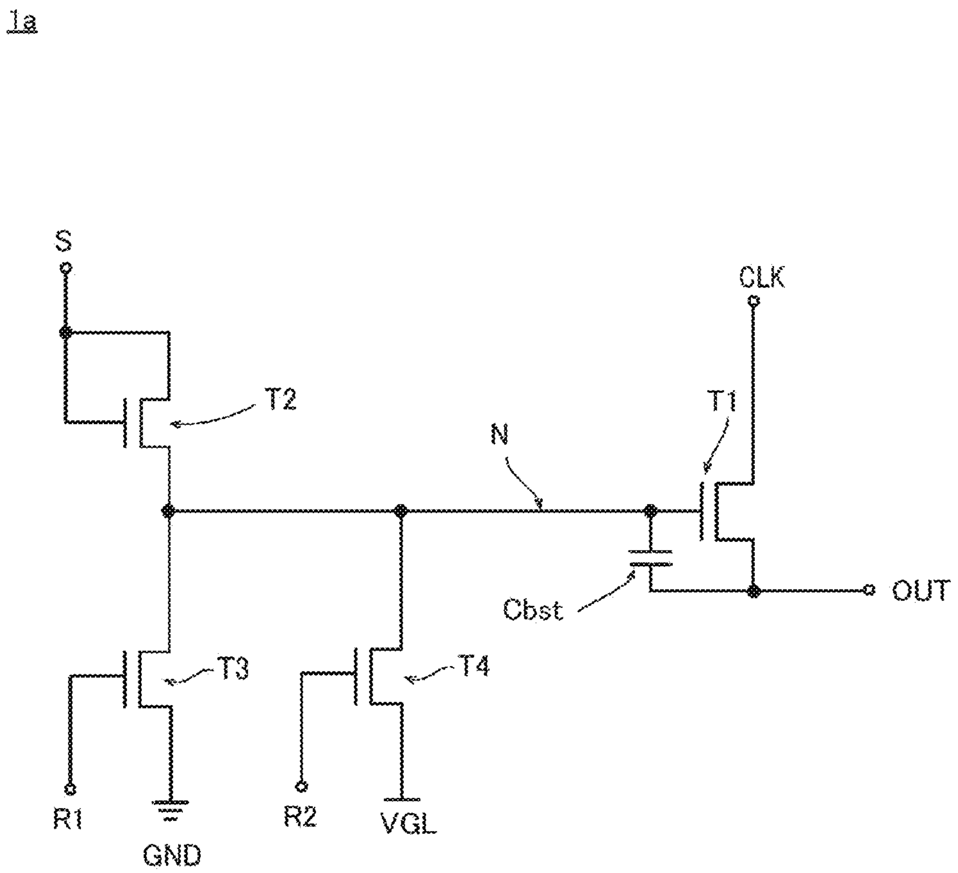
FIG. 5 is a circuit diagram showing a configuration of a unit circuit.

FIG. 4 is a diagram showing a configuration of the gate drive circuit 1. FIG. 5 is a circuit diagram showing a configuration of the unit circuit 1*a*.

As shown in FIG. 4, the gate drive circuit 1 is composed of a plurality of stages; the gate drive circuit 1 includes a shift register circuit that sequentially supplies drive signals to the gate lines 11 (G (n) and the like in the example of FIG. 4) in response to the input of the clock signals GCK1 to GCK8. The gate drive circuit 1 includes a plurality of unit circuits 1*a*, each constituting one of the plurality of stages and outputting a drive signal to the connected gate line 11. The number of unit circuits 1*a* is the same as the number of gate lines 11. FIG. 4 shows a part (eight) of the plurality of unit circuits 1*a*. One of the clock signals GCK1 to GCK8 supplied from the level shifter circuit 6 is inputted to one of the unit circuits 1*a*. For example, the clock signal GCK1 is inputted to the unit circuit 1*a* of an n-th stage (n is a natural number). Further, the unit circuit 1*a* receives, at a terminal S thereof, a drive signal outputted from a terminal OUT of the unit circuit 1*a* of a stage before the stage to which it belongs (the stage two stages before in the example of FIG. 4), as a set signal. Note that, although not shown, the gate start pulse signal GSP is inputted, as a set signal, to the unit circuit 1*a* of the first stage and the unit circuit 1*a* of the second stage.

Here, in the present embodiment, the unit circuit 1*a* receives, at a terminal R1 thereof, a drive signal outputted from a terminal OUT of the unit circuit 1*a* of a stage after the stage to which it belongs (the stage three stages later in the example of FIG. 4), as a first reset signal. Further, the unit circuit 1*a* receives, at a terminal R2 thereof, a drive signal outputted from a terminal OUT of the unit circuit 1*a* of a stage further later than the above-described stage (the stage five stages later in the example of FIG. 4), as a second reset signal. When the gate start pulse signal GSP is inputted to the unit circuit 1*a* of the first stage and the unit circuit 1*a* of the second stage, the drive signals are sequentially outputted to the gate lines 11 in the order from the unit circuit 1*a* of the first stage to the unit circuit 1*a* of the last stage.

As shown in FIG. 5, the unit circuit 1*a* includes transistors T1 to T4, a bootstrap capacitor Cbst, and a node N. The node N connects the transistors T1 to T4 and the bootstrap capacitor Cbst.

The transistor T1 is a transistor for outputting a drive signal to the gate line 11 connected to the unit circuit 1*a*. The transistor T1 outputs the drive signal to the gate line 11 in response to one of the clock signals GCK1 to GCK8 inputted to a terminal CLK. The bootstrap capacitor Cbst is a capacitor for turning on the transistor T1 by a raised potential obtained by charging.

The gate electrode of the transistor T1 is connected to the node N. The source electrode of the transistor T1 is connected to the terminal CLK. The drain electrode of the transistor T1 is connected to a terminal OUT from which the drive signal is outputted. One end of the bootstrap capacitor Cbst is connected to the gate electrode of the transistor T1, and the other end of the bootstrap capacitor Cbst is connected to the drain electrode of the transistor T1.

The transistor T2 is a transistor for raising (charging) the potential of the node N in response to the input of a set signal. The gate electrode and the source electrode of the transistor T2 are connected to the terminal S from which the set signal is inputted. The drain electrode of the transistor T2 is connected to the node N.

The transistor T3 is a transistor for lowering (discharging) the potential of the node N in response to the input of a first reset signal. The gate electrode of the transistor T3 is connected to a terminal R1 to which the first reset signal is inputted. In the present embodiment, the source electrode of the transistor T3 is connected to a terminal having the ground potential GND. Thus, the potential of the source electrode of the transistor T3 is lower than the gate-on voltage VGH and higher than the gate-off voltage VGL. The drive signal outputted from the terminal OUT of the unit circuit 1*a* of the (n+3)-th stage is inputted, as the first reset signal, to the transistor T3 of the unit circuit 1*a* of the n-th stage.

The transistor T4 is a transistor for lowering (discharging) the potential of the node N in response to the input of a second reset signal. The gate electrode of the transistor T4 is connected to a terminal R2 to which the second reset signal is inputted. In the present embodiment, the source electrode of the transistor T4 is connected to a terminal to which the gate-off voltage VGL is applied. Thus, the potential of the source electrode of the transistor T4 is the same as the potential of the gate-off voltage VGL. The drive signal outputted from the terminal OUT of the unit circuit 1*a* of the (n+5)-th stage is inputted, as the second reset signal, to the transistor T4 of the unit circuit 1*a* of the n-th stage.

The semiconductor layers of the transistors T1 to T4 include an oxide semiconductor. An In—Ga—Zn—O oxide semiconductor with crystallinity can be used as the oxide semiconductor. With such a configuration, it is possible to reduce power consumption, speed up driving, and achieve high definition compared to a case where each transistor is composed of an amorphous silicon.

Operation of Unit Circuit 1*a*

Figure 6:
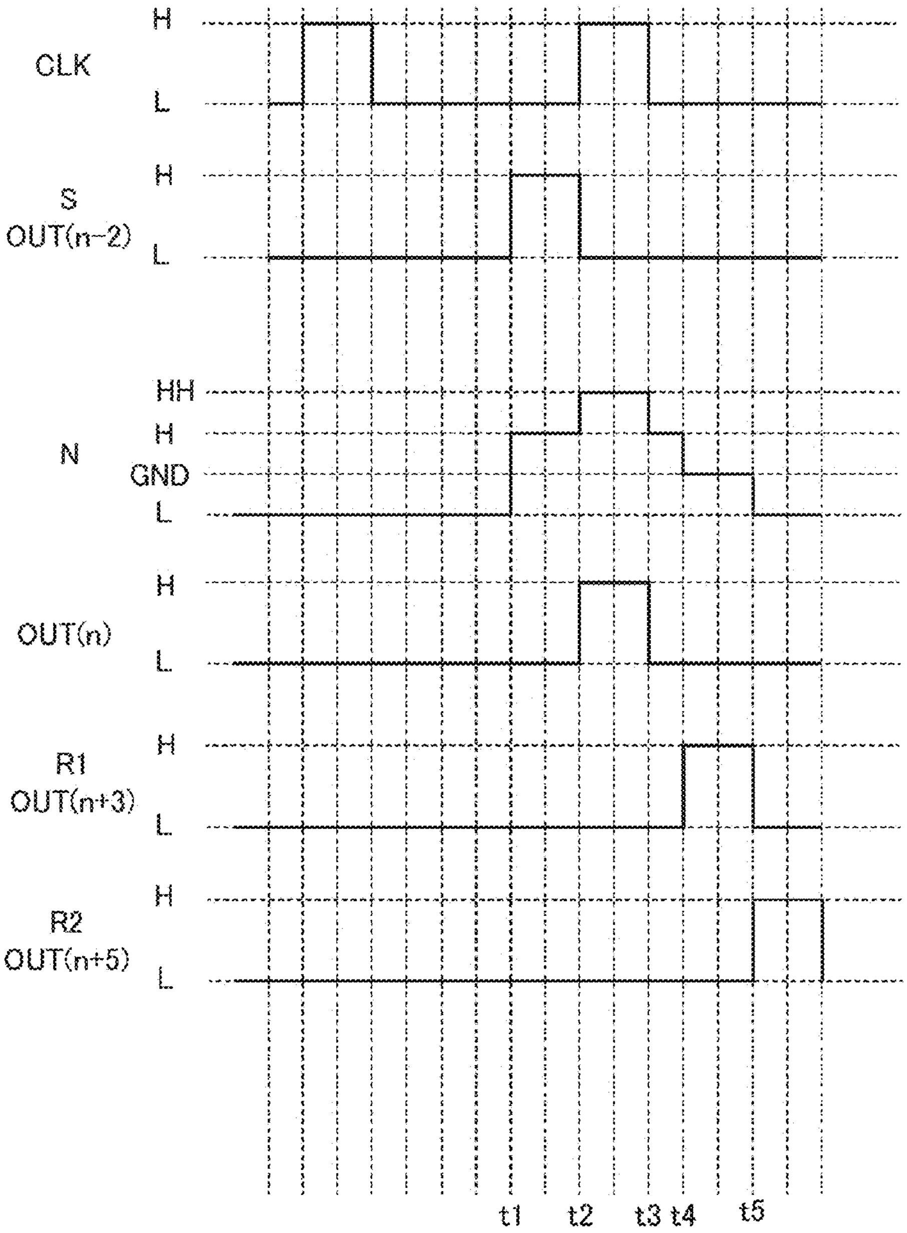
FIG. 6 is a timing diagram for explaining the relationship between each terminal of the unit circuit and the potential according to the embodiment.

FIG. 6 is a timing diagram for explaining the relationship between each terminal of the unit circuit 1*a* and the potential according to the present embodiment. FIG. 6 illustrates an example of the relationship between each terminal of the unit circuit 1*a* of the n-th stage and the potential. Here, a state in which the voltage is higher than the High-level is denoted as "HH".

As shown in FIG. 6, the clock signal GCK1 is inputted to the terminal CLK of the unit circuit 1*a*. At time point t1, when a set signal is inputted to the terminal S (i.e., when the voltage becomes "H"), the node N is charged from "L" to "H". At time point t2, when the potential of the terminal CLK becomes "H", the potential of the node N rises from "H" to "HH" due to the capacitance of the bootstrap capacitor Cbst disposed between the node N and the drain electrode of the transistor T1. Thus, the potential of the terminal OUT becomes "H", the drive signal (gate signal) is outputted; and at the same time, the set signal is outputted to the unit circuit 1*a* of a stage two stages later (i.e., the (n+2)-th stage), the first reset signal is outputted to the unit circuit 1*a* of a stage three stages before (i.e., the (n−3)-th stage), and the second reset signal is outputted to the unit circuit 1*a* of a stage five stages before (i.e., the (n−5)-th stage).

At time point t3, the potential of the terminal CLK changes from "H" to "L," and the potential of the node N drops from "HH" to "H".

At time point t4, the first reset signal is inputted to the terminal R1, and the potential of the terminal R1 changes from "L" to "H". Here, the potential of the source electrode of the transistor T3 is the ground potential GND. Therefore, when the first reset signal is supplied to the gate electrode of the transistor T3 and the potential of the gate electrode becomes "H" (at time point t4), the potential difference between the potential of the drain electrode (gate-on voltage VGH) and the potential of the source electrode (ground potential GND) can be made smaller than the difference between the gate-on voltage VGH and the gate-off voltage VGL. At time point t4, when the transistor T3 is turned on, the potential of the node N drops from the gate-on voltage VGH to the ground potential GND.

At time point t5, the second reset signal is inputted to the terminal R2, and the potential of the terminal R2 changes from "L" to "H". Here, the potential of the drain electrode of the transistor T4 is the ground potential GND. Therefore, when the second reset signal is supplied to the gate electrode of the transistor T4 and the potential of the gate electrode becomes "H" (at time point t5), the potential difference between the potential of the drain electrode (ground potential GND) and the potential of the source electrode (gate-off voltage VGL) can be made smaller than the difference between the gate-on voltage VGH and the gate-off voltage VGL. At time point t5, when the transistor T4 is turned on, the potential of the node N drops from the ground potential GND to the gate-off voltage VGL.

With such a configuration, since the drain-source voltage applied to the transistor T3 and the transistor T4 can be reduced, the deterioration speed of the transistor T3 and the transistor T4 can be reduced.

Comparison Results with Comparative Example

Next, comparison results between an example of one embodiment (hereinafter referred to as "Example") and a Comparative Example will be described with reference to FIGS. 7 to 11. Note that in the Comparative Example, the same configurations as those of the Example are denoted by the same reference signs and description thereof will be omitted. Further, the Comparative Example is illustrated for the purpose of explaining the effects of the Example and does not represent the related art.

Figure 7:
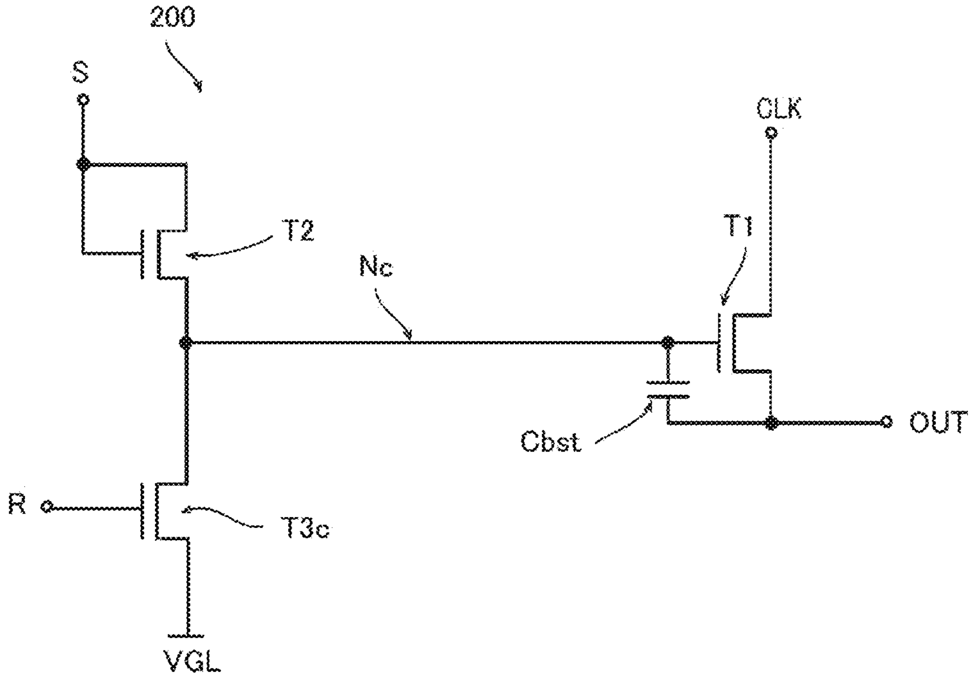
FIG. 7 is a diagram for explaining a configuration of a unit circuit according to a Comparative Example.

FIG. 7 is a diagram for explaining the configuration of a unit circuit 200 according to the Comparative Example. The unit circuit 200 according to the Comparative Example includes a transistor T3*c* and a node Nc. A terminal to which the gate-off voltage VGL is applied is connected to the source electrode of the transistor T3*c*. A terminal R is connected to the gate electrode of the transistor T3*c*. Only the bootstrap capacitor Cbst, the transistor T1, the transistor T2, and the transistor T3*c* are connected to the node Nc.

Figure 8:
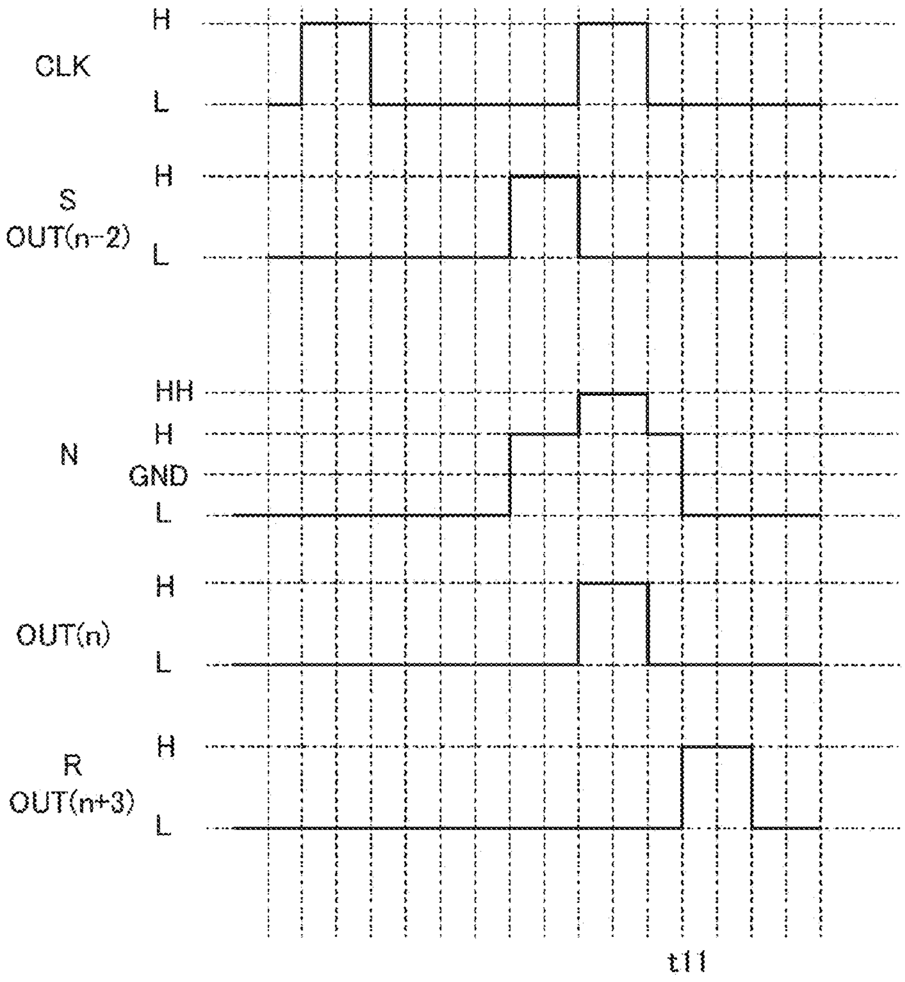
FIG. 8 is a timing diagram for explaining the relationship between each terminal of the unit circuit and the potential according to the Comparative Example.

FIG. 8 is a timing diagram for explaining the relationship between each terminal of the unit circuit 200 and the potential according to the Comparative Example. FIG. 8 shows the unit circuit of the n-th stage according to the Comparative Example. As shown in FIG. 8, a drive signal from a terminal OUT of the unit circuit 200 of the (n+3)-th stage is inputted, as a reset signal, to the terminal R. When the potential of the terminal R changes from "L" to "H" at time point t11, the potential of the node Nc drops from "H" to "L".

Figure 9:
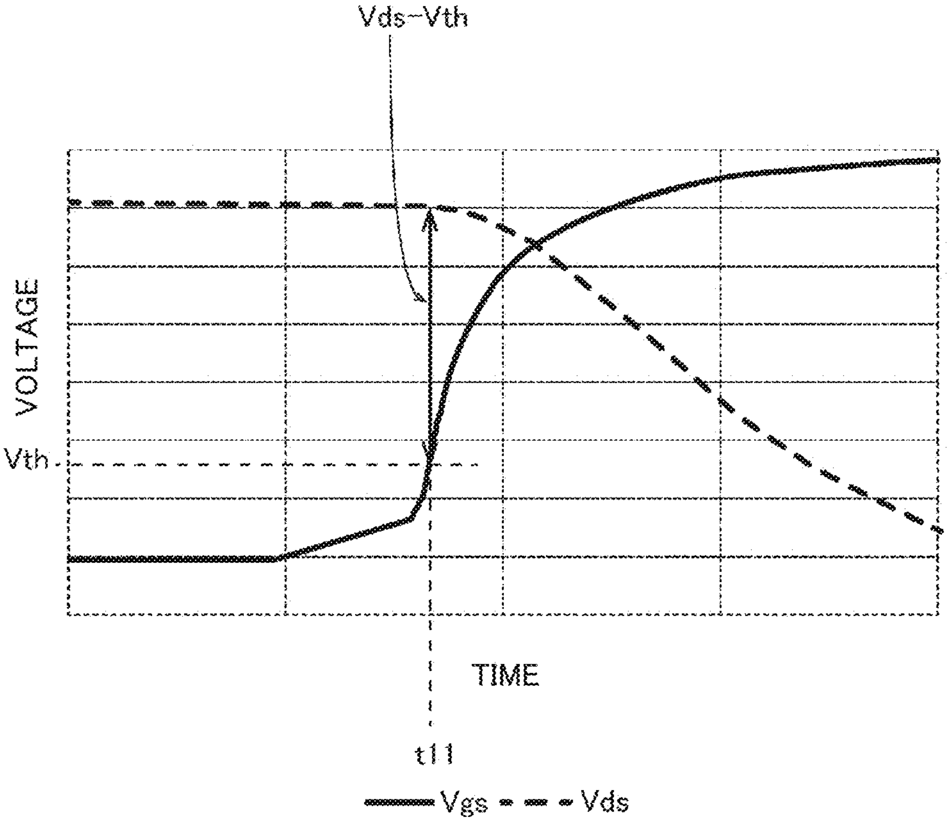
FIG. 9 is a diagram for explaining the waveform of the voltage applied to a transistor of the unit circuit according to the Comparative Example.

FIG. 9 is a diagram for explaining the waveform of the voltage applied to the transistor T3*c* of the unit circuit 200 according to the Comparative Example. FIG. 9 shows a potential difference Vgs between the gate electrode and the source electrode of the transistor T3*c*, a potential difference Vds between the drain electrode and the source electrode of the transistor T3*c*, and a threshold voltage Vth of the transistor T3*c*. The potential difference Vds and the potential difference Vgs are results obtained by performing a measurement, a simulation, or a calculation. As shown in FIG. 9, at time point t11, the potential difference Vgs changes from a state in which it is below the threshold voltage Vth to a state in which it is above the threshold voltage Vth (i.e., the potential difference Vgs crosses the threshold voltage Vth). At this time, the potential difference Vds becomes higher than the threshold voltage Vth. In such a case, hot carriers are generated, so that there is a high possibility that the transistor T3*c* is deteriorated.

Figure 10:
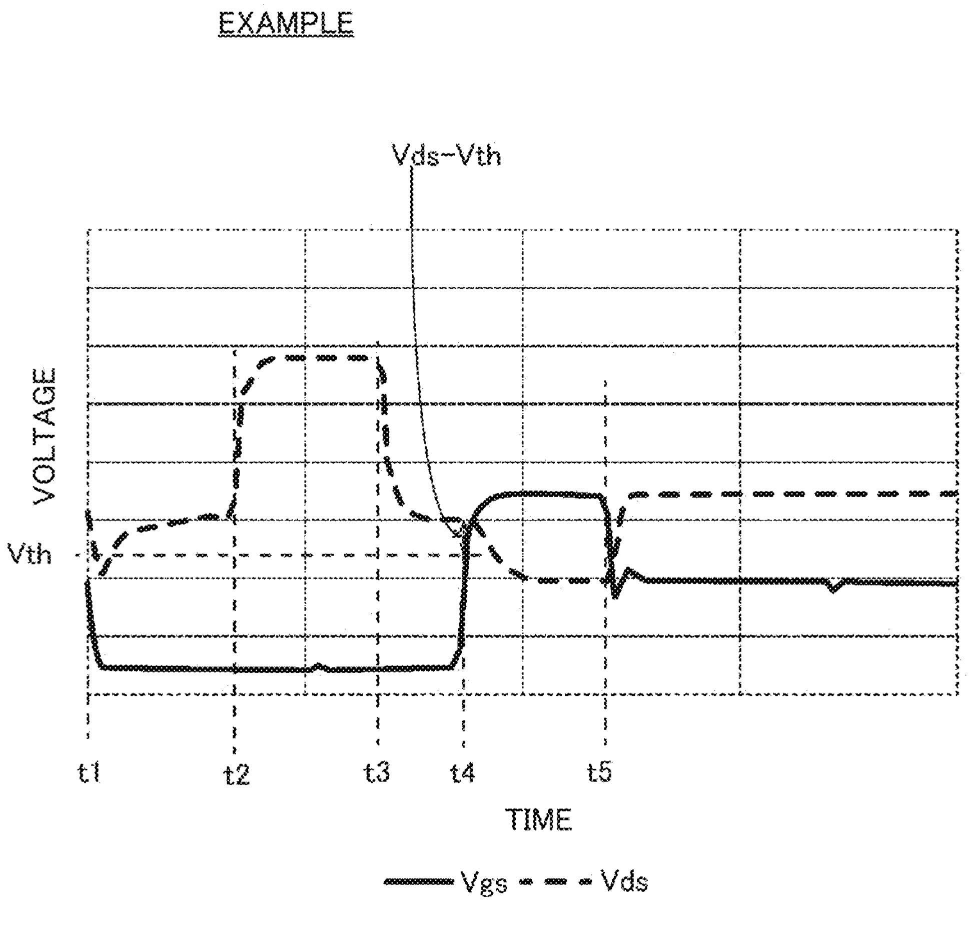
FIG. 10 is a diagram for explaining the waveform of the voltage applied to a transistor of the unit circuit according to an Example.
Figure 11:
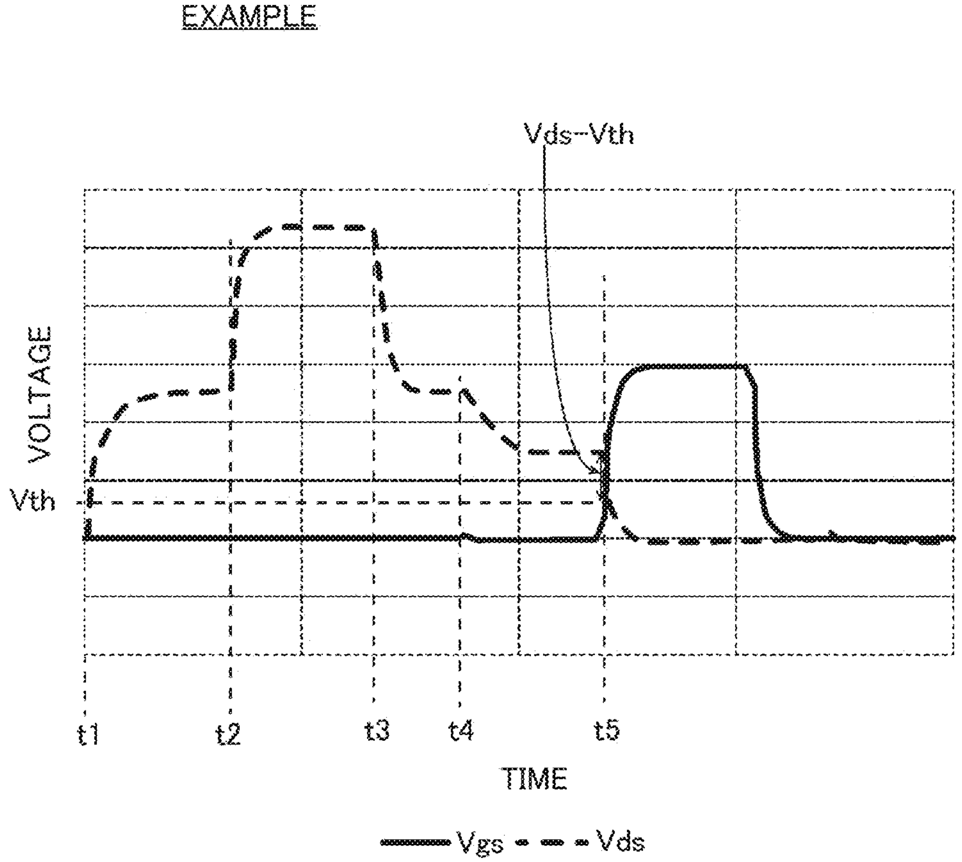
FIG. 11 is a diagram for explaining the waveform of the voltage applied to another transistor of the unit circuit according to the Example.

FIG. 10 is a diagram for explaining the waveform of the voltage applied to the transistor T3 of the unit circuit 1*a* according to the Example. FIG. 11 is a diagram for explaining the waveform of the voltage applied to the transistor T4 of the unit circuit 1*a* according to the Example. Note that the voltage of each vertical increment in FIGS. 10 and 11 is the same as the voltage of each vertical increment in FIG. 9.

FIG. 10 shows a potential difference Vgs between the gate electrode and the source electrode of transistor T3, a potential difference Vds between the drain electrode and the source electrode of transistor T3, and a threshold voltage Vth of transistor T3. FIG. 11 shows a potential difference Vgs between the gate electrode and the source electrode of the transistor T4, a potential difference Vds between the drain electrode and the source electrode of the transistor T4, and a threshold voltage Vth of the transistor T4. The potential difference Vds and the potential difference Vgs of the transistor T3 and the potential difference Vds and the potential difference Vgs of the transistor T4 are results respectively obtained by performing measurements.

As shown in FIG. 10, at time point t4, the potential difference Vgs changes from a state in which it is below the threshold voltage Vth to a state in which it is above the threshold voltage Vth (i.e., the potential difference Vgs crosses the threshold voltage Vth). At this time, the difference value (Vds-Vth) between the potential difference Vds and the threshold voltage Vth is less than ¼ of the difference value (Vds−Vth) according to the Comparative Example shown in FIG. 9. As shown in FIG. 11, at time point t5, the potential difference Vgs changes from a state in which it is below the threshold voltage Vth to a state in which it is above the threshold voltage Vth (i.e., the potential difference Vgs crosses the threshold voltage Vth). At this time, the difference value (Vds−Vth) between the potential difference Vds and the threshold voltage Vth is less than ¼ of the difference value (Vds-Vth) according to the Comparative Example shown in FIG. 9. As described above, since the difference value (Vds−Vth) of the transistor T3 and the transistor T4 according to the Example is small when they are turned on, the generation of hot carriers is suppressed. As a result, the deterioration of the transistor T3 and the transistor T4 can be suppressed.

Modifications

Although the embodiment of the present disclosure has been described above, the embodiment described above is merely an example for implementing the present disclosure. Therefore, the present disclosure is not limited to the embodiment described above, and can be implemented by appropriately modifying the embodiment described above without departing from the spirit thereof. Hereinafter, modifications of the embodiment described above will be described.

(1) In the embodiment described above, an example in which the display device is configured as a liquid crystal display device is shown, but the present disclosure is not limited to such an example. For example, the display device may be configured as an organic EL display device or a micro-LED display device.

(2) In the embodiment described above, an example in which the ground potential GND is applied to the source electrode of the transistor T3 is shown, but the present disclosure is not limited to such an example. For example, a voltage different from the ground potential GND and lower than the gate-on voltage and higher than the gate-off voltage may be applied to the source electrode of the transistor T3.

(3) The embodiment described above shows an example in which a drive signal from the unit circuit of a stage three stages later (i.e., the (n+3)-th stage) is used as the first reset signal and an example in which a drive signal from the unit circuit of a stage five stages later (i.e., the (n+5)-th stage) is used as the second reset signal; however, the present disclosure is not limited to these examples. For example, at least one of the first reset signal and the second reset signal may be supplied from the level shifter circuit, or a drive signal from a unit circuit other than the unit circuit described above may be used.

(4) In the embodiment described above, an example in which clock signals in eight phases of GCK1 to GCK8 are provided is shown, but the present disclosure is not limited to such an example. Clock signals in one to seven phases, nine phases or more than nine phases may alternatively be provided.

(5) In the above embodiment describes an example in which the transistor includes an In—Ga—Zn—O oxide semiconductor with crystallinity, but the present disclosure is not limited to such an example. The transistor may alternatively include an amorphous In—Ga—Zn—O oxide semiconductor, an oxide semiconductor other than an In—Ga—Zn—O oxide semiconductor, or silicon.

(6) In the embodiment described above, an example in which the bootstrap capacitor Cost is provided in the unit circuit is shown, but the present disclosure is not limited to such an example. When bootstrap operation can be performed by the capacitance of the transistor T1, the bootstrap capacitor does not have to be provided in the unit circuit.

(7) In the embodiment described above, in an n-channel transistor, of the drain electrode and the source electrode, the one with the higher potential may be called the drain electrode; however, in the description of the present disclosure, one of the two electrodes is defined as the drain electrode and the other as the source electrode, and the potential of the source electrode may be higher than the potential of the drain electrode.

The above-described configuration can also be described as follows.

A drive circuit according to a first configuration is a drive circuit including a plurality of unit circuits that each output a drive signal to one of scanning signal lines of a scanning signal line group. The unit circuits each include: a node; a first transistor that outputs the drive signal to the scanning signal line, wherein the node is connected to the gate electrode of the first transistor, a clock signal is applied to the source electrode of the first transistor, and the drain electrode of the first transistor is connected to the scanning signal line; a second transistor at which a set signal is inputted to the unit circuit, wherein the set signal is inputted to the gate electrode of the second transistor, and the drain electrode of the second transistor is connected to the node; a third transistor at which a first reset signal is inputted to the unit circuit, wherein the first reset signal is inputted to the gate electrode of the third transistor, the drain electrode of the third transistor is connected to the node, and a voltage lower than a gate-on voltage and higher than a gate-off voltage is applied to the source electrode of the third transistor; and a fourth transistor at which a second reset signal having a high level is inputted at a time point later than the first reset signal, wherein the second reset signal is inputted to the gate electrode of the fourth transistor, the drain electrode of the fourth transistor is connected to the node, and the gate-off voltage is applied to the source electrode of the fourth transistor (a first configuration).

With the first configuration described above, by discharging the node stepwise with two transistors (the transistor T3 and the transistor T4), it is possible to reduce the drain-source voltage of each of the two transistors. More specifically, a voltage lower than the gate-on voltage and higher than the gate-off voltage (hereinafter referred to as "intermediate voltage" in this step) is applied to the source electrode of the third transistor. Therefore, when the first reset signal is supplied to the gate electrode of the third transistor and the potential of the gate electrode becomes a high level, the potential difference between the potential of the drain electrode and the potential of the source electrode can be made smaller than the difference value between the gate-on voltage and the gate-off voltage. As a result, the drain-source voltage applied to the third transistor, which discharges the node of the unit circuit, can be reduced, so that the generation of hot carriers that cause deterioration of the transistor can be suppressed. Thus, the deterioration speed of the third transistor can be reduced. Further, when the third transistor is turned on, the potential of the node can be lowered from the gate-on voltage to a potential equal to the intermediate voltage. Further, the gate-off voltage is applied to the source electrode of the fourth transistor. Therefore, when the second reset signal is supplied to the fourth transistor, the potential of the node can be lowered (reset) from the intermediate voltage to the gate-off voltage. When the second reset signal is supplied to the gate electrode of the fourth transistor and the potential of the gate electrode becomes a high level, the potential difference between the potential of the drain electrode (intermediate voltage) and the potential of the source electrode (gate-off voltage) can be made smaller than the difference between the gate-on voltage and the gate-off voltage. As a result, the drain-source voltage applied to the fourth transistor, which discharges the node of the unit circuit, can be reduced, so that the generation of hot carriers that cause the deterioration of the transistor can be suppressed. Thus, the deterioration speed of the fourth transistor can be reduced.

In the first configuration, the source electrode of the third transistor may be connected to a terminal having a ground potential that is lower than the gate-on voltage and higher than the gate-off voltage (a second configuration).

With the second configuration, since the ground potential can be used as a potential that is lower than the gate-on voltage and higher than the gate-off voltage, a power supply device for generating a voltage (potential) that is lower than the gate-on voltage and higher than the gate-off voltage is unnecessary.

In the first configuration or the second configuration, as the first reset signal, a drive signal from a unit circuit that outputs a drive signal at a second time point later than a first time point at which the unit circuit including the third transistor outputs a drive signal may be inputted to the gate electrode of the third transistor. As the second reset signal, a drive signal from a unit circuit that outputs a drive signal at a time point later than the second time point may be inputted to the gate electrode of the fourth transistor (a third configuration).

With the third configuration, the second reset signal can be supplied to the fourth transistor without inputting a new reset signal to the drive circuit.

A display device according to a fourth configuration includes: the drive circuit according to any one of the first to third configurations; a substrate on which the drive circuit is disposed; and a counter substrate disposed opposite to the substrate (a fourth configuration).

With the fourth configuration, since the drain-source voltage applied to the third transistor and fourth transistor, which discharge the node of the unit circuit, can be reduced, it is possible to provide a display device capable of suppressing deterioration of the third transistor and fourth transistor.

The present disclosure contains subject matter related to that disclosed in Japanese Priority Patent Application JP2024-157875 filed in the Japan Patent Office on Sep. 11, 2024, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A drive circuit comprising a plurality of unit circuits that each output a drive signal to one of scanning signal lines of a scanning signal line group, wherein the unit circuits each include:

a node;

a first transistor that outputs the drive signal to the scanning signal line, wherein the node is connected to a gate electrode of the first transistor, a clock signal is applied to a source electrode of the first transistor, and a drain electrode of the first transistor is connected to the scanning signal line;

a second transistor at which a set signal is inputted to the unit circuit, wherein the set signal is inputted to a gate electrode of the second transistor, and a drain electrode of the second transistor is connected to the node;

a third transistor at which a first reset signal is inputted to the unit circuit, wherein the first reset signal is inputted to a gate electrode of the third transistor, a drain electrode of the third transistor is connected to the node, and a voltage lower than a gate-on voltage and higher than a gate-off voltage is applied to a source electrode of the third transistor; and a fourth transistor at which a second reset signal having a high level is inputted at a time point later than the first reset signal, wherein the second reset signal is inputted to a gate electrode of the fourth transistor, a drain electrode of the fourth transistor is connected to the node, and the gate-off voltage is applied to a source electrode of the fourth transistor.

2. The drive circuit according to claim 1, wherein the source electrode of the third transistor is connected to a terminal having a ground potential that is lower than the gate-on voltage and higher than the gate-off voltage.

3. The drive circuit according to claim 1, wherein as the first reset signal, a drive signal from a unit circuit that outputs a drive signal at a second time point later than a first time point at which the unit circuit including the third transistor outputs a drive signal is inputted to the gate electrode of the third transistor, and as the second reset signal, a drive signal from a unit circuit that outputs a drive signal at a time point later than the second time point is inputted to the gate electrode of the fourth transistor.

4. A display device comprising:

the drive circuit according to claim 1, and a substrate on which the scanning signal line group is disposed.

* * * * *